(12) United States Patent
Vollmer et al.

(10) Patent No.: US 7,957,617 B2
(45) Date of Patent: Jun. 7, 2011

(54) METHODS, MATERIALS AND DEVICES FOR LIGHT MANIPULATION WITH ORIENTED MOLECULAR ASSEMBLIES IN MICRONSCALE PHOTONIC CIRCUIT ELEMENTS WITH HIGH-Q OR SLOW LIGHT

(75) Inventors: Frank Vollmer, Cambridge, MA (US); Juraj Topolancik, Malden, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 12/299,630

(22) PCT Filed: May 10, 2007

(86) PCT No.: PCT/US2007/068683
§ 371 (c)(1),
(2), (4) Date: Nov. 5, 2008

(87) PCT Pub. No.: WO2007/134177
PCT Pub. Date: Nov. 22, 2007

(65) Prior Publication Data
US 2009/0136181 A1 May 28, 2009

Related U.S. Application Data

(60) Provisional application No. 60/747,041, filed on May 11, 2006.

(51) Int. Cl.
*G02B 6/26* (2006.01)
(52) U.S. Cl. ............................................ 385/39; 385/50
(58) Field of Classification Search .................... 385/50, 385/38; 427/58; 204/192.15; 205/80
See application file for complete search history.

(56) References Cited

U.S. PATENT DOCUMENTS

| 4,995,697 A | 2/1991 | Adamovsky |
| 5,009,505 A | 4/1991 | Malvern |
| 5,231,611 A | 7/1993 | Laznicka, Jr. |

(Continued)

OTHER PUBLICATIONS

H. Okamura and K. Iwatsuki, "A Finesse-Enhanced Er-Doped Fiber Ring Resonator," Journal of Lightwave Technology, vol. 9, No. 11 (Nov. 1991).

*Primary Examiner* — Ellen Kim
(74) *Attorney, Agent, or Firm* — 24IP Law Group; Timothy R. DeWitt

(57) ABSTRACT

An optical device that comprises an input waveguide, an output waveguide, a high-Q resonant or photonic structure that generate slow light connected to the input waveguide and the output waveguide, and an interface, surface or mode volume modified with at least one material formed from a single molecule, an ordered aggregate of molecules or nanostructures. The optical device may include more than one input waveguide, output waveguide, high-Q resonant or photonic structure and interface, surface or mode volume. The high-Q resonant or photonic structure may comprise at least one selected from the group of: microspherical cavities, microtoroidal cavities, microring-cavities, photonic crystal defect cavities, fabry-perot cavities, photonic crystal waveguides. The ordered aggregate of molecules or nanostructures comprises at least one selected from the group of: organic or biological monolayers, biological complexes, cell membranes, bacterial membranes, virus assemblies, nanowire or nanotube assemblies, quantum-dot assemblies, one or more assemblies containing one or more rhodopsins, green fluorescence proteins, diarylethers, lipid bilayers, chloroplasts or components, mitochondria or components, cellular or bacterial organelles or components, bacterial S-layers, photochromic molecules. Further, the molecular aggregate may exhibit a photoinduced response.

38 Claims, 15 Drawing Sheets

U.S. PATENT DOCUMENTS

| | | |
|---|---|---|
| 5,436,454 A | 7/1995 | Bornstein et al. |
| 5,538,850 A | 7/1996 | King et al. |
| 5,663,790 A | 9/1997 | Ekstrom et al. |
| 6,319,540 B1 | 11/2001 | Van Antwerp et al. |
| 6,490,039 B2 | 12/2002 | Maleki et al. |
| 6,580,842 B1 | 6/2003 | Hehlen et al. |
| 6,721,053 B1 | 4/2004 | Maseeh |
| 6,781,690 B2 | 8/2004 | Armstrong |
| 6,835,394 B1 | 12/2004 | Discher et al. |
| 6,842,548 B2 | 1/2005 | Loock et al. |
| 6,901,101 B2 | 5/2005 | Frick |
| 7,019,847 B1 | 3/2006 | Bearman et al. |
| 7,031,585 B2 | 4/2006 | Soljacioc et al. |
| 7,123,800 B2 | 10/2006 | Kaplan |
| 7,446,880 B2 | 11/2008 | Vollmer et al. |
| 2002/0079453 A1 | 6/2002 | Tapalian et al. |
| 2002/0140946 A1 | 10/2002 | Groot |
| 2003/0035964 A1 | 2/2003 | Richard et al. |
| 2003/0098971 A1 | 5/2003 | Laffont |
| 2004/0023396 A1 | 2/2004 | Boyd |
| 2004/0175174 A1 | 9/2004 | Suhami |
| 2004/0190584 A1 | 9/2004 | Spoonhower et al. |
| 2005/0270633 A1 | 12/2005 | Herman et al. |
| 2005/0271805 A1 | 12/2005 | Kambe et al. |
| 2006/0062507 A1 | 3/2006 | Yanik et al. |
| 2006/0062508 A1 | 3/2006 | Guo et al. |
| 2007/0196571 A1* | 8/2007 | Ozin et al. .......... 427/199 |

* cited by examiner

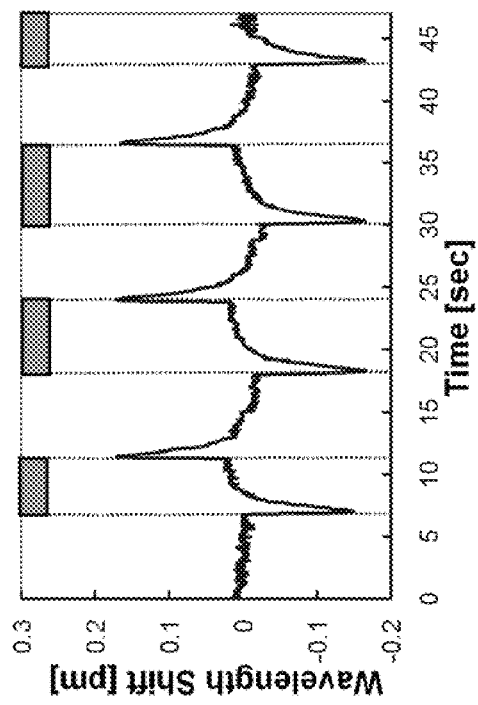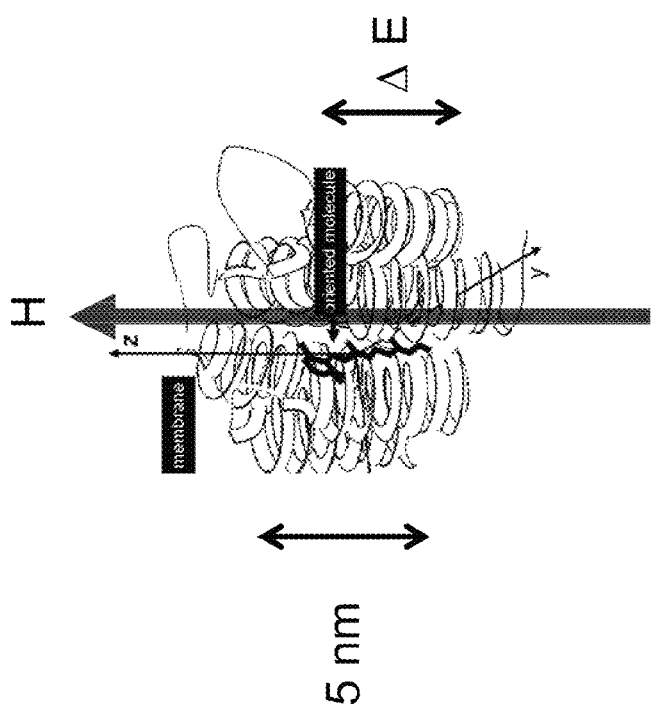
Fig. 13

METHODS, MATERIALS AND DEVICES FOR LIGHT MANIPULATION WITH ORIENTED MOLECULAR ASSEMBLIES IN MICRONSCALE PHOTONIC CIRCUIT ELEMENTS WITH HIGH-Q OR SLOW LIGHT

CROSS-REFERENCE TO RELATED APPLICATIONS

The present application claims the benefit of the filing date of U.S. Provisional Patent Application Ser. No. 60/747,041 entitled "Methods, Materials And Devices For Light Manipulation With Oriented Molecular Assemblies In Micronscale Photonic Circuit Elements With High-Q Or Slow Light" and filed on May 11, 2006 by inventors Frank Vollmer and Juraj Topolancik.

Also, related subject matter is disclosed in U.S. Provisional Patent Application Ser. No. 60/758,040 entitled "Optical Device and Method for Detection using Optical Cavities such as Ring Resonators or Microsphere, -Disk, -Ring or -Toroid Cavities that contain a Gain Medium such as Erbium" and filed by Frank Vollmer on Jan. 11, 2006.

The above cross-referenced related applications are hereby incorporated by reference herein in its entirety.

STATEMENT REGARDING FEDERALLY SPONSORED RESEARCH OR DEVELOPMENT

None.

BACKGROUND OF THE INVENTION

1. Field of the Invention

The present invention relates to methods and devices to effectively manipulate light with light alone while keeping the device dimensions small. To this end, a great deal of effort has been spent on identifying materials with strong optical nonlinearities and developing micron-scale components that amplify the optical response where the light-matter interaction is weak. For integration purposes it is also desirable that photonic functions are based on phase modulation rather than absorption so that the carrier-signal loses no energy in the process. The conventional approach has been to exploit relatively weak optical nonlinearities of the established photonic materials to control the propagation of optical signals with high-intensity pumps.

The present invention also relates to methods and devices for all-optical storage media such as interferometric bacteriorhodopsin films or photon storage in slow-light devices.

The present invention also relates to methods and devices that use optical functionality in organic and biological materials. Superior performance can be expected from biomaterials such as the photochromic protein bacteriorhodopsin (bR). Their photoresponse, characterized by high quantum yields and fatigue resistance, has been optimized by evolution and explored in a variety of optical applications. It is equally important that optically functional biomolecules are often found in organized self-assembled structures such as membranes.

The present invention also relates to methods and devices for light manipulation such as photonic crystals, resonant couplers, waveguide couplers, etc.

2. Brief Description of the Related Art

All-optical switches and logic gates are needed in photonic circuits that control the flow of light at near-infrared (IR) frequencies. Recent advances in optical device-miniaturization exemplified by the emergence of photonic bandgap nanostructures suggest molecules as possible functional components. A wealth of optical functionality has been discovered in organic and biological molecules. Superior performance can be expected from biomaterials such as the photochromic protein bacteriorhodopsin (bR). Their photoresponse, characterized by high quantum yields and fatigue resistance, has been optimized by evolution and explored in a variety of optical applications. It is equally important that optically functional biomolecules are often found in organized self-assembled structures such as membranes that can be readily crafted onto surfaces of existing photonic components or formed de novo. The expected weak optical response of a single molecular layer, however, has prevented the use of molecular self-assemblies for the direct modulation (control) of light propagation in photonic microstructures.

In parallel with these developments, microcavities with Q-factors of up to ~$10^{10}$ have found applications in solid-state optical switches, low-threshold lasers, and ultra-sensitive optical biosensors. In biosensing, binding of only a few molecules can shift the resonant frequency of the microcavity. It would be intriguing to extend this approach and use its high sensitivity to monitor structural changes within molecules, such as charge transfer and isomerization. Fast and reversible photoinduced structural changes characteristic of photochromic materials are particularly interesting as they imply the use of molecular systems for all-optical switching. Photoinduced transformation of a photochromic molecule between two isomers alters the absorption spectra and other physicochemical properties such as refractive index, oxidation/reduction potential, molecular conformation and fluorescence. Because of this diversity of photo-controllable properties photochromic molecules are poised to play an important role as functional elements in components of integrated photonic devices. Such applications generally require high speed, thermal irreversibility and high-fatigue resistance. Substances such as diarylethenes and a transmembrane protein bacteriorhodopsin (BR) endure numerous photocycles ($10^4$ and $10^5$, respectively) and therefore hold the necessary robustness for use in optical devices. Consequently, the photoinduced anisotropies of these materials have been exploited extensively for ultra-fast photonic switching in the visible band. Based on the absorption shift, induced birefringence and changes in the refractive index in the demonstrated techniques cannot be directly extended into the telecommunication band (1,310/1,550 nm) where the known photochromic compounds are virtually transparent. The BR membrane protein encloses a retinal chromophore that is covalently bound to Lys216 residue via a protonated Shiff base (SB). More specifically, seven surrounding trans-membrane α-helices fix the molecular axis of retinal at an angle of θ=67° from the membrane plane normal as indicated in FIG. 9(a). Upon illumination BR undergoes a complex photocycle involving isomerization of the chromophore and proton transfer across the lipid membrane. The photocycle can be simplified as a bistable molecular switch due to the significant lifetimes of the thermodynamically stable planar all-trans protonated SB found in the bR state of the protein, and the metastable 13-cis deprotonated SB found in the protein's M state. Retinal conformation can be controlled optically by illuminating the protein around the maximum absorption wavelengths of 568 nm and 412 nm, driving BR directly into the M and bR state, respectively:

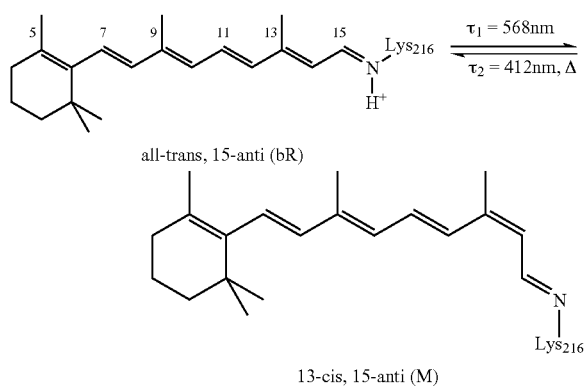

all-trans, 15-anti (bR)

$\tau_1 = 568\text{nm}$
$\tau_2 = 412\text{nm}, \Delta$ 13-cis, 15-anti (M)

In the wild-type BR the M state relaxes thermally into the bR state through several spectroscopically distinct intermediaries within 10 ms. The relaxation timescale can however be altered by genetic mutations and controlling the pH of the solution as exemplified by the significantly prolonged M-state lifetime from 500 ms at pH=5 to 12 seconds at pH=8 in the D96N mutant.

All-optical switches and logic gates, high-Q cavities and optical properties of bacteriorhodopsin are discussed in the following references:

1. Joannopoulos, J. D., Villeneuve, P. R, and Fan, S. Photonic crystals: Putting a new twist on light. Nature 386, 143-149 (1997).
2. Takano, H., Akahane, Y., Asano, T., Noda, S. In-plane-type channel drop filter in a two-dimensional photonic crystal slab. Appl. Phys. Lett. 84, 2226-2228 (2004).
3. Almeida, V. R., Barrios, C. A., Panepucci, R. R., Lipson, M. All-optical control of light on a silicon chip. Nature 431, 1081-1084 (2004).
4. Spillane, S. M., Kippenberg, T. J., Vahala, K. J. Ultralow-threshold Raman laser using a spherical dielectric microcavity. Nature 415, 621-623 (2002).
5. Vollmer, F., Braun, D. Libchaber, A., Khoshsima, M., Teraoka, I., Arnold, S. Protein detection by optical shift of a resonant microcavity. Appl. Phys. Lett. 80, 4057-4059 (2002).
6. Vollmer, F., Arnold, S. Braun, D. Teraoka, I., Libchaber, A. Multiplexed DNA Quantification by Spectroscopic Shift of Two Microsphere Cavities. Biophys. J. 85, 1974-1979 (2003).
7. Oesterhelt, D., Stoeckenius, W. Rhodopsin-like protein from purple membrane of halobacterium-halobium. Nat. New Biol. 233, 149-152 (1971).
8. Birge, R. R. Photophysics and molecular applications of the rhodopsins. Annu. Rev. Phys. Chem. 41, 683-733 (1990).
9. Feringa, B. L. (Ed.) Molecular Switches (Wiley-VCH GmbH, Weinheim, Germany, 2001).
10. Irie, M. Diarylethenes for memories and switches. Chem. Rev. 2000, 1685-1716 (2000).
11. Kirkby, C. J. G., Bennion, I. Organic photochromics for spatial light-modulation. IEE Proc. J 133, 98-104 (1986).
12. Huang, Y., Wu, S.-T., Zhao, Y. Photonic switching based on the photoinduced birefringence in bacteriorhodopsin films. Appl. Phys. Lett. 84, 2028-2030 (2004).
13. Ormos, P. et al. Protein-based integrated optical switching and modulation. Appl. Phys. Lett. 80, 4060-4062 (2002).
14. Ebisawa, F., Hoshino, M., Sukegawa, K. Self-holding photochromic polymer Mach-Zehnder optical switch. Appl. Phys. Lett. 65, 2919-2921 (1994).
15. Sasaki, J., Shichida, Y., Lanyi, J. K., Maeda, A. Protein changes associated with reprotonation of the Schiff base in the photocycle of Asp96-->Asn bacteriorhodopsin. The MN intermediate with unprotonated Schiff base but N-like protein structure. J. Biol. Chem. 267, 20782-20786 (1992).
16. Yoshida, M., Ohno, K., Takeuchi, Y. J. Altered activity of bacteriorhodopsin in high-concentration of guanidine-hydrochloride. J. Biochem. 87, 491-495 (1980).
17. Arnold, S., Khoshsima, M., Teraoka, I., Holler, S., Vollmer, F. Shift of whispering-gallery modes in microspheres by protein adsorption. Opt. Lett. 28, 272-274 (2003).
18. Blaurock, A. E. and Stoekenius, D. Structure of purple membrane. Nature New Biol. 233, 152-155 (1971).
19. Lee, H. M., Kim, J., Kim, C.-J., Kim, K. S. Ab initio study of the isomerization of retinal chromophore and its derivatives. J. Chem. Phys. 116, 6549-6559 (2002).
20. Su, Z., Liang, W. Chen, G. Ground-state reduced intensity matrices, effective Hamiltonians and optical properties of Schiff bases of retinal. Chem. Phys. 247, 185-192 (1999).
21. Toto, J. L., Toto, T. T., de Melo, C. P. Ab initio studies of the polarizabilities of retinal analogs. J. Chem. Phys. 101, 3945-3951 (1994).
22. Luecke, H., Schobert, B., Richter H.-T., Cartailler, J.-P., Lanyi, J. K. Structural changes in bacteriorhodopsin during ion transport at 2 Angstrom resolution. Science 286, 255-260 (1999).
23. Cai, M., Painter, O., Vahala, K. J. Observation of critical coupling in a fiber taper to a silica-microsphere whispering-gallery mode system. Phys. Rev. Lett. 85, 74-77 (2000).
24. Rokhsari, H., Vahala, K. J. Ultralow loss, high Q, four port resonant couplers for quantum optics and photonics. Phys. Rev. Lett. 92, 253905-1-253905-4 (2004).
25. He, J.-A., Samuelson, L., Li, L., Kumar, J., Tripathy, S. K. Oriented bacteriorhodopsin/polycation multilayers by electrostatic layer-by-layer assembly. Langmuir 14, 1674-1679 (1998).
26. Fisher, K. A., Yanagimoto, K., Stoeckenius, W. Oriented adsorption of purple membrane to cationic surfaces. Journal of Cell Biology 77, 611-621 (1978).
27. A. Hache, M. Bourgeois Appl. Phys. Lett. 77, 4089 (2000).
28. G. M. Whitesides, J. P. Mathias, C. T. Seto, Science 254, 1312 (1991).
29. M. Noto et al., Appl. Phys. Lett. 87, 223901 (2005).
30. Z. Salamon, G. Tollin, Biophys. J. 80, 1557 (2001).
31. A. Hinchcliffe, R. W. Munn, Molecular Electromagnetism (John Wiley & Sons, Wiltshire, UK, 1985).

SUMMARY OF THE INVENTION

The present inventions are designs, materials and methods for fabrication of hybrid molecular-photonic architectures (molecular photonic circuits, MPCs, FIGS. 1(a) and (b)) that employ ordered molecules and other nanostructures for optical manipulation on a small scale. This invention represents a unique bottom-up approach for fabrication of MPCs by spontaneous or induced formation of functional elements by self-assembly of molecular aggregates onto conventional microfabricated platforms. A specific photonic function is performed by a single molecule or monolayer or multilayer of ordered molecules. To this end, photochromic molecular ensembles undergoing fast and reversible photoinduced conformational changes are essential for all-optical signal routing applications. Light manipulation on the molecular level relies on changing the phase or the intensity of probing light as a result of interactions with molecular dipoles. Although the perturbation to an optical mode caused by a single molecule is negligible, the effect becomes more pronounced when the mode interacts with highly-organized molecular assemblies. In such anisotropic systems, the simplest of which is a molecular monolayer, the optical response is not obscured by local clustering and bulk averaging, and can therefore be tailored polarization and frequency specific. The invention makes use of photonic circuit elements in which the interaction with a single molecule, molecular layer or aggregate is enhanced. Such photonic circuit elements use either high-Q resonant structures such as microcavities or architectures that generate slow light such as photonic crystal waveguides. Methods for MPC fabrication are disclosed. Such methods describe the crafting of molecules onto the surface or directly into the optical path of MPC photonic circuit elements using e.g. self-assembly of monolayers, multilayers or crystal structures. Disclosed are MPCs that use organic and biological materials to perform basic photonic functions such as logic operations (switches, logic gates, and inverters), memory, variable time delay and tunable wavelength division multiplexing. Preferred embodiments of our invention use photoinduced dynamic molecular transitions in self-assembled photochromic molecular structures to reversibly configure a micron-scale high-Q MPC. Specific embodiments of our invention exemplify MPCs for use as a spectroscopic tool sensitive to molecular dynamics and orientations of molecular self-assemblies and for measuring changes of molecular polarizabilities at optical frequencies. Specific embodiments of our invention can be used as all-optical switches and routers that operate in the telecom band (1310 nm/1550 nm) and that can manipulate intense IR light with low intensity visible control pumps. A similar scheme can be used to amplify a weak, e.g. visible, signal by conversion into a strong, e.g. infrared, signal.

In a preferred embodiment, the present invention is an optical device that comprises an input waveguide, an output waveguide, a high-Q resonant or photonic structure that generates slow light connected to the input waveguide and the output waveguide, and an interface, surface or mode volume modified with at least one material formed from a single molecule, an ordered aggregate of molecules or nanostructures. The optical device may include more than one input waveguide, output waveguide, high-Q resonant or photonic structure and interface, surface or mode volume. The high-Q resonant or photonic structure may comprise at least one selected from the group of: microspherical cavities, microtoroidal cavities, microring-cavities, photonic crystal defect cavities, fabry-perot cavities, photonic crystal waveguides. The single molecule, ordered aggregate of molecules or nanostructures comprises at least one selected from the group of: organic or biological monolayers, biological complexes, cell membranes, bacterial membranes, virus assemblies, nanowire or nanotube assemblies, quantum-dot assemblies, one or more assemblies containing one or more rhodopsins, green fluorescence proteins, diarylethers, lipid bilayers, chloroplasts or components, mitochondria or components, cellular or bacterial organelles or components, bacterial S-layers, photochromic molecules. Further, the molecular aggregate may exhibit a photoinduced response.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which:

FIG. 6(a) is a schematic reaction for a photochromic compound that can be switched between two states bR and M (here for bacteriorhodopsin) by exposure to red or blue light, respectively. Below is an example of a cis-trans isomerization often found in photochromes, here for the retinal chromophore of bacteriorhodopsin. The two photoswitchable conformations bR and M are associated with different absorption spectra illustrated in FIG. 6(b). FIG. 6(c) shows examples for other biomaterials based on proteins, DNA or membranes.

FIG. 7 is also a diagram of a preferred embodiment of the present invention for information storage and retrieval. In this case, the conformational state of the bacteriorhodopsin encodes a bit of information.

FIG. 10(a) shows (A) a top-view photomicrograph of a bR-coated silica microsphere between two tapered fibers (the image was obtained at ambient illumination with a CCD camera); (B) the same microsphere with whispering-gallery resonances excited with a green pump beam from port 1; (C) an IR image of 1,311-nm probe beam propagation with the pump turned off and; (D) an IR-probe propagation with the pump on.

FIG. 10(b) shows a resonant transmission spectra of a microsphere coated with three bR-layers measured in ports 2 (top) and 3 (bottom) by scanning the near-IR laser around the probing wavelength $\lambda^*=1,311.039$ nm. With the pump off (black line) port 2 shows a high and port 3 a low transmission at $\lambda^*$. The reverse is true when the pump is on (gray line).

FIG. 13 shows a differential response of a resonant coupler with a bacteriorhodpsin layer due to a photoinduced membrane potential.

DETAILED DESCRIPTION OF THE PREFERRED EMBODIMENTS

Figure 1A:
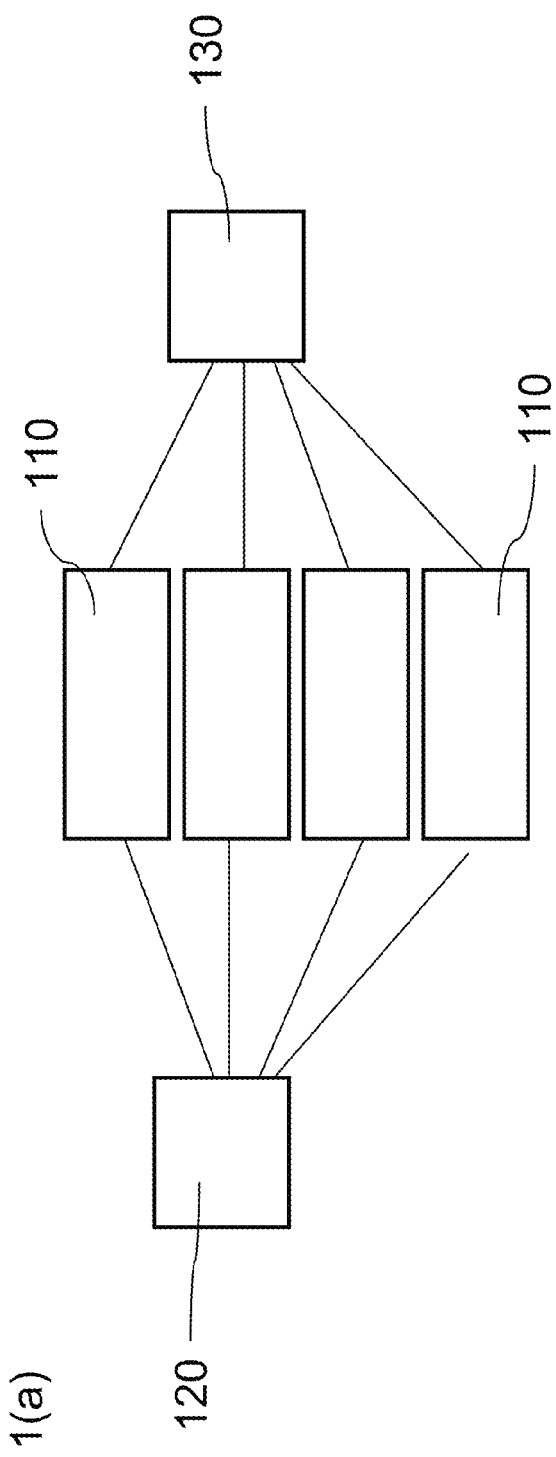
FIG. 1(a) is a diagram of the elements of a photonic circuit in accordance with a preferred embodiment of the present invention.

All-optical switches and logic gates are needed as components in integrated photonic circuits that control the flow of light at near-infrared (IR) frequencies. The recent drive to optical device miniaturization exemplified by the emergence of photonic bandgap nanostructures suggests molecules as possible functional elements. However, materials with a strong optical response in the near-IR, necessary for direct modulation at small scales, are generally unavailable. This limitation may be overcome by resonant amplification of the otherwise weak optical response through light recirculation in optical (high-Q) cavities or in photonic structures that generate slow light. High-Q cavities and slow light devices can be micro-fabricated. Common photonic architectures are ring resonators or photonic crystals—which also provide a convenient platform to interface with molecular aggregates. Molecules can be crafted on the surface or directly into the optical path of the photonic structure by methods such as molecular self-assembly. One of the simplest molecular assemblies is a self-assembled monolayer (SAM). SAMs can interact with the optical mode confined in the high-Q photonic circuit element or slow light structure. Light manipulation on the molecular level relies on changing the phase or the intensity of probing light as a result of interactions with molecular dipoles. Although the perturbation to an optical mode caused by a single molecule is very small, the effect becomes more pronounced when the mode interacts with highly-organized molecular assemblies. In such anisotropic systems, the simplest of which is a molecular monolayer, the optical response is not obscured by local clustering and bulk averaging, and can therefore be tailored polarization and frequency specific. The use of high-Q microcavities and slow light structures opens up the possibility to use SAMs with extremely low optical density to effectively manipulate light at small scales. In one preferred embodiment we show a biological SAM performing a basic photonic switching function on a scale of a few hundreds of microns. All-optical signal routing between two optical fibers was achieved by using a high-Q optical microcavity to resonantly enhance interaction of the evanescent field of an optical mode with a Bacteriorhodopsin (bR) monolayer. The demonstrated all-optical coupler operates in the frequency-domain, far from the bR absorption bands, which allows it to modulate intense near infrared probe beams with low-intensity visible pumps. The widely available bR protein found in the purple membrane of Halobacter Halobium is our photochromic material of choice for the switching demonstration due to its excellent fatigue resistance (>10$^6$ photocycles), high conversion quantum yields ($\Phi$=0.64), and good thermal stability. The bR protein encloses a retinal chromophore that is covalently bound to Lys216 residue via a protonated Schiff base (SB). More specifically, seven transmembrane $\alpha$-helices fix the retinal at an angle $\phi$ from the membrane plane normal as indicated in FIG. 9(b). Photoexcitation of bR triggers a complex photocycle that involves isomerization and rotation of the retinal chromophore, and a proton transfer across the lipid membrane. During the photocycle, the retinal changes its conformation between the all-trans, 15-anti protonated SB found in the thermodynamically stable ground state; and the 13-cis, 15-anti deprotonated SB prevalent in the metastable M state of bR. These two states identify a bistable photochromic system used for light modulation. Excitation of the retinal protein around the ground state maximum absorption wavelength of 568 nm drives bR through several intermediaries into the M state within 50 ms. Conversely, illumination of bR around the M state absorption peak of 412 nm directly recovers the ground state within 200 ns. The following photoreaction represents the molecular basis for all-optical switching with bR:

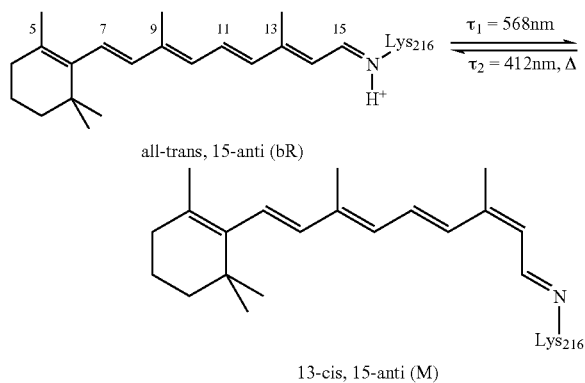

In the wild-type bR the M state is reprotonated and relaxes thermally into the ground state through several spectroscopically distinct intermediaries within ~10 ms. However, the M state can be stabilized by genetic mutations and by chemically disrupting the reprotonation process as exemplified by the D96N bR mutant in which the M-state lifetime is significantly enhanced from 200 ms at pH=5 to ~20 seconds at pH=8. The lifetime can be prolonged even further (to minutes) by chemical modifications of the ambient solution making D96N an almost ideal, thermally irreversible photochromic material with a practically complete optical conversion between two photochromic states.

Photoinduced isomerization of the retinal alters the optical properties of the bR membrane such as the absorption spectrum, the molecular polarizability ($\alpha$) and hyperpolarizabilities. The conformational change will therefore perturb optical modes interacting with bR even when there is little or no spectral overlap between the mode frequency and the bR electronic transition bands. Resonant modes in optical microcavities or slow light structures can significantly enhance this interaction conveying the perturbation as a frequency shift of optical resonances. The resulting shifts are proportional to change of the molecular polarizability ($\Delta\alpha$). High-Q silica microspheres, -rings, -toroids or photonic crystal cavities (FIG. 2) are particularly sensitive to $\Delta\alpha$ even when the change occurs in an ultra-thin, optically dilute monolayer. A typical 300-$\mu$m microsphere coated with a single monolayer can resolve a shift corresponding to $\Delta\alpha$=3 au. The estimate assumes a bR retinal surface density of $9.12\times10^{12}$ cm$^{-2}$, Q of $2\times10^6$ limited by vibrational overtone absorption in water, and a typical experimental resolution for the resonant shift of ~1/50 of the linewidth. The sensitivity is rather remarkable in light of the fact that a significantly larger $\Delta\alpha$ is expected as a result of the retinal isomerization and deprotonation. Calculated values of $\Delta\alpha$ are in the range of a few hundreds of atomic units and we measured isomerization-induced resonant shifts ($\Delta\lambda_{iso}$) that correspond to $\Delta\alpha$~-460 au. Since the bR membrane is highly anisotropic, $\Delta\lambda_{iso}$ also depends on the linear polarization direction of the probing mode. As indicated in FIG. 9(a), the resonances are polarized either parallel with (TE) or normal to (TM) the microsphere surface supporting the bR membrane. The retinal axis, defined here along the $C_5$-$C_{13}$ conjugated double-bond direction, resides primarily in the membrane plane and its out-of-plane orientation angle changes from 25.2° in the ground state to 33.4° in the M state as determined by X-ray diffraction. With the average retinal out-of-plane orientation at 29.3°, $\Delta\lambda_{iso}$ is expected to be larger for the TE than the TM mode. Our experiments with microcavities coated with bR monolayers confirm this.

Figure 8:
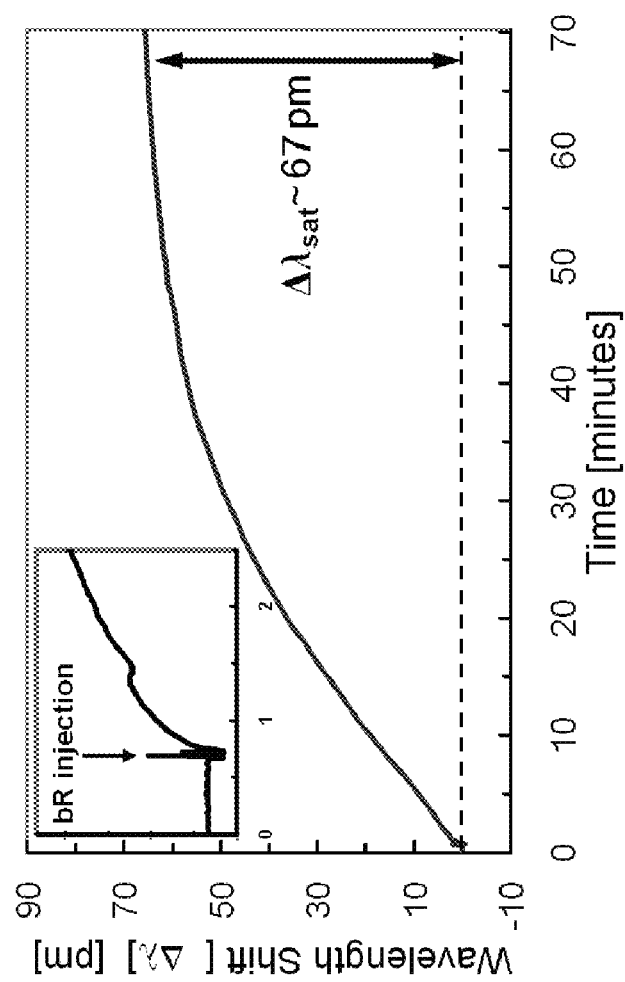
FIG. 8 shows the wavelength shift for the TM polarization of a microsphere resonance after injection of solution of bR membranes (0.05 mg/ml) into the sample cell. The shift saturates at ~70 minutes of incubation time.
Figure 9:
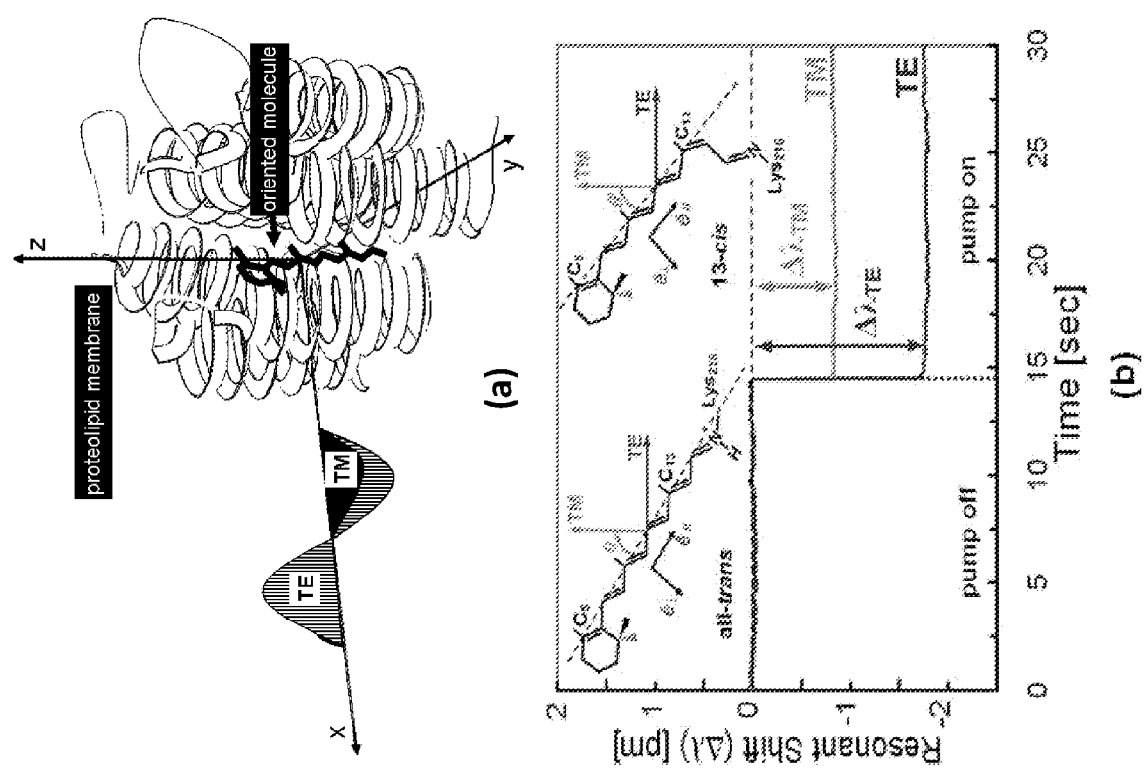
FIG. 9(a) shows the three-dimensional ribbon-model of seven transmembrane helixes labeled from A to G (green) representing the structure of bR protein with covalently bound all-trans retinal chromophore (red). Linearly polarized microcavity resonances probe the protein in the direction orthogonal to (TM) or parallel with (TE) the membrane adsorbed on the microsphere surface (xy-plane). The transmembrane structure of bacteriorhodopsin including lipids, protein and retinal chromophore, and the orientation of microspherical TE and TM modes.
FIG. 9(b) shows the measured resonant wavelength shifts $\Delta\lambda$ for the TE-(black line) and the TM-mode (gray line) upon retinal photoisomerization. Pump-beam illumination at $t\cong14.5$ s triggers all-trans to 13-cis isomerization and ~8.2° rotation of the retinal chromophore (shown in the insets). $\Delta\lambda$ is larger for the TE-mode since the retinal is oriented primarily in the xy-plane.

The photochromic monolayers were formed in-situ by electrostatic self-assembly of bR from a solution. A monolayer assembly can be monitored by measuring the wavelength shift of an optical resonance (FIG. 8). The shift saturates for complete assembly. FIG. 9 shows a typical resonant shift of a microsphere cavity covered with such a monolayer upon exposure to a visible pump that triggers photoisomerization. The isomerization is measured simultaneously with a 1,311 nm probe for both probe polarizations. We have consistently measured the shift ratio for the TE and TM polarizations ($\Delta\lambda_{iso,\,TE}/\Delta\lambda_{iso,\,TM}$) of 2.1±0.1, which, as we show, is directly related to the average orientation angle of the retinal relative to the bR membrane normal ($\langle\theta\rangle$). We consider the retinal as an axially symmetric molecule. All-trans to 13-cis isomerization decreases $\theta$ along the major molecular axis ($\hat{e}_\parallel$) and increases it in the perpendicular direction ($\hat{e}\perp$). The shift ratio is related to $\langle\theta\rangle$ by:

$$\frac{\Delta\lambda_{TE}}{\Delta\lambda_{TM}} \approx \frac{1}{2}\left(\frac{1+\cos^2\langle\theta\rangle+\beta\sin^2\langle\theta\rangle}{\sin^2\langle\theta\rangle+\beta\cos^2\langle\theta\rangle}\right).$$

Here $\beta$ denotes the ratio of the photoinduced changes in $\alpha$ along and perpendicular to the major molecular axis $\beta=\delta\alpha_\parallel/\delta\alpha_\perp$. According to the result of ab initio calculations of $\alpha$, $|\delta\alpha_\parallel|$ is an order of magnitude lager than $|\delta\alpha\perp|$, and therefore $\beta \approx -10$. The measured value of $\Delta\lambda_{iso,\ TE}/\Delta\lambda_{iso,\ TM} \cong 2.1$ corresponds to $\langle\theta\rangle$ of ~61°, which is consistent with the reported retinal orientation angle.

Figure 10:
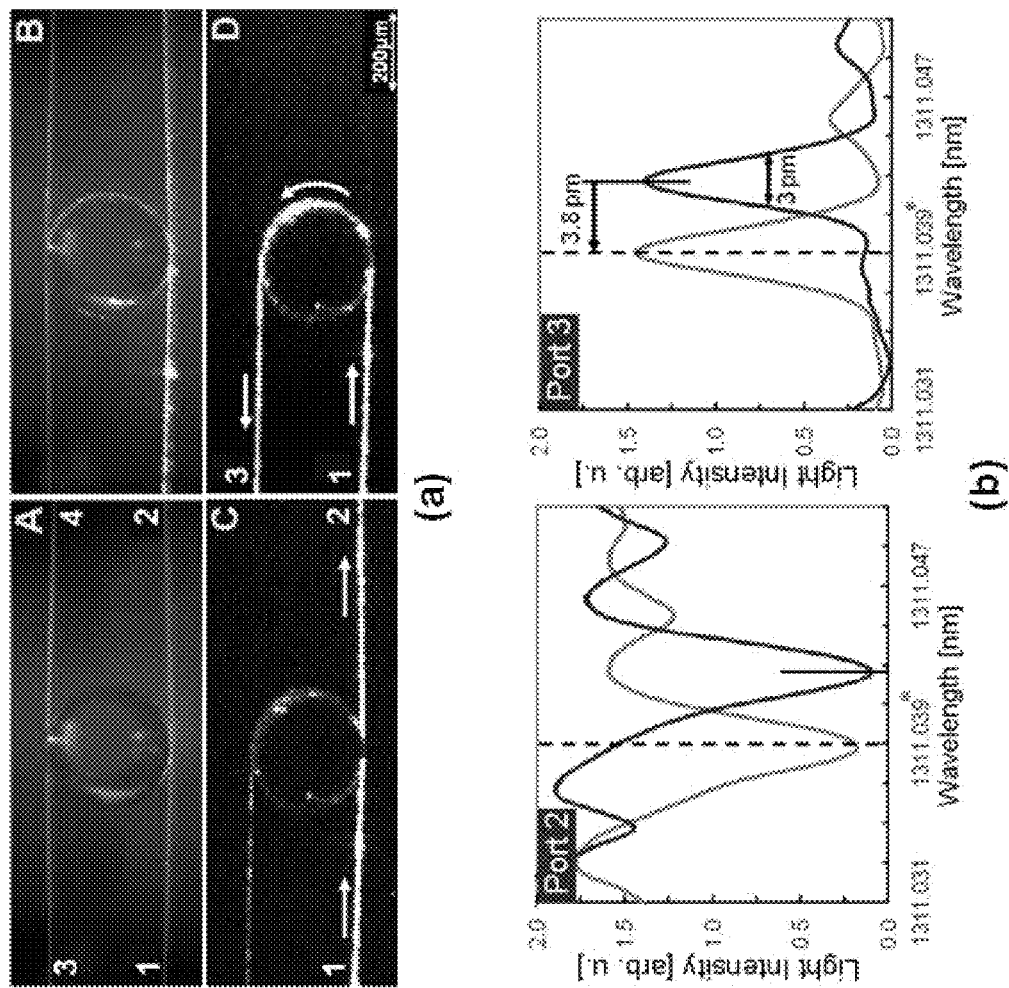

Exploring possible photonic applications, we utilize the change in $\alpha$ in a basic all-optical switching scheme. We use a microsphere coated with D96N in a four-port device shown schematically in FIG. 7. The microcavity 710 serves as a tunable resonant coupler between two waveguides 720, 730. Fast tuning (switching) of a fiber-coupled IR source (port 1) between the two output ports (ports 2 and 3) is photoinduced, activated with fiber-coupled green and blue pump lasers that control the conformational state of the adsorbed photochromic layer. The molecularly functionalized microcavity thus redirects the flow of near-IR light between two optical fibers. The blue pump is optional as the M-state relaxes spontaneously into the ground state. The switching results for a green-pump modulation are summarized in FIG. 10. Photomicrographs in FIG. 10(a) show the top view of the coupler obtained with a conventional charge-coupled device (CCD) camera (top) and the corresponding IR images showing the flow of the probe beam (bottom). With the green pump turned off, the probing light from input port 1 is detuned from the microsphere resonance and is directly transmitted into the output port 2 (FIG. 10(a): C). The corresponding resonances, acquired in port 2 (resonant trough) and port 3 (resonant peak) by scanning the IR probe around the probing wavelength ($\lambda^* = 1,311.039$ nm), indicate high transmission at $\lambda^*$ through port 2 and low transmission through port 3 (FIG. 10(b)). The reverse is true when the pump beam is turned on. The pump evanescently excites WGMs propagating around the microsphere's equator inducing bR photoisomerization along their path. A low-power green cw laser (<200 µW at 532 nm) is sufficient for his purpose as its effective absorption is resonantly enhanced. Isomerization reduces the retinal polarizability tuning the peak/trough of the resonance to match the wavelength of the IR probe which is then rerouted into the output port 3 (FIG. 10(a): D).

Isomerization of a self-assembled bR monolayer shifts the Lorenzian-shaped resonance by ~⅔ of its full-width-at-half-maximum attenuating transmission in port 2 by −3.9 dB. The shift can be further enhanced by increasing the effective surface density of the retinal by controlled layering of several oriented bR membranes using the alternating (cationic polymer/bR) electrostatic adsorption. The switching contrast is maximized with three bR monolayers the photoisomerization of which shifts the resonance to the midpoint between its original position and that of the nearest neighbor. The transmission spectra before and after isomerization show −9.4 dB extinction in port 2, and 9.8 dB increase in transmission in port 3 (FIG. 10(b)).

Figure 11:
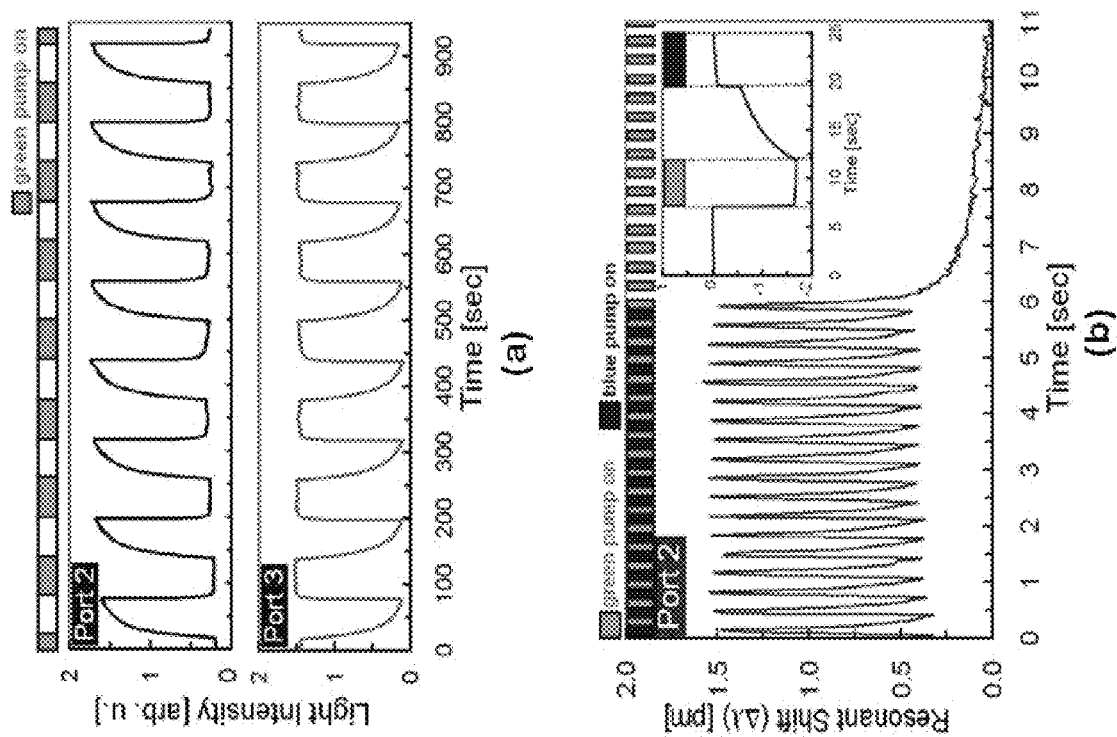
FIG. 11(a) shows the switching kinetics for green-pump modulation measured in ports 2 and 3. The time-resolved transmitted intensities of the probe reflect a fast photoinduced transition of bR from the ground (all-trans) to the M state (13-cis) followed by a slow ($\tau$~11 s) thermal recovery of the ground state.
FIG. 11(b) shows a faster switching response obtained by alternating illumination with green and blue pumps. The trace represents the position of the TE resonant peak and the inset shows the slow thermal M to ground state relaxation turning into a fast photoinduced transition when the blue pump is applied at $t\cong19.5$ s.
Figure 12:
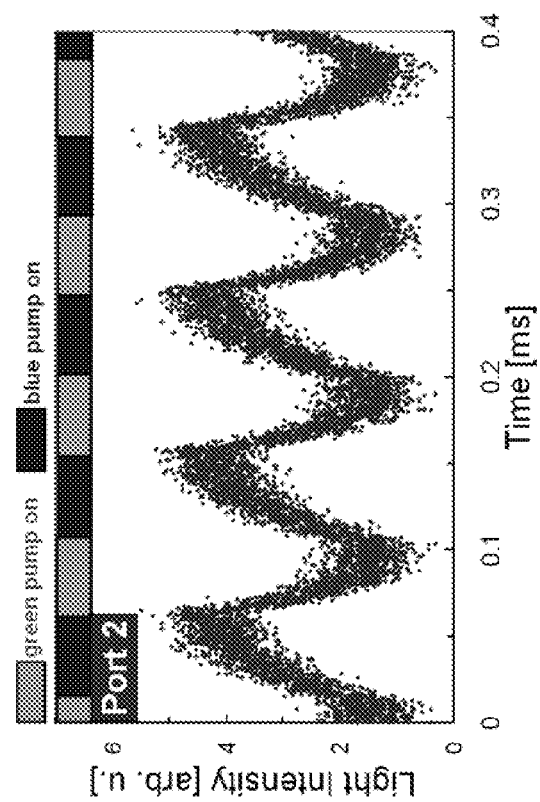
FIG. 12 shows that increasing the modulation speed decreases the average light density of the pump which lowers the switching contrast. The figure shows the temporal response of a microsphere with three adsorbed wild-type bR layers to a fast, 10 kHz modulation. Green and blue pump beams (~200 μW, cw) were modulated with step functions at ~0.1 ms intervals and the transmitted intensity of the probe beam was collected with an InGaAs photodiode in port 2. The IR-probe modulation response was recorded with a fast scanning oscilloscope. For the low pump-intensities used in our measurements, the maximum modulation frequency is limited to ~10 kHz were the switching contrast (defined here as the signal change divided by the noise level) is reduced to ~2. Enhanced switching contrast at higher modulation rates can be achieved with mode-locked green and blue pumps. The high optical densities would guarantee fast and complete ground to M state conversion. The switching speed of bR-based devices is limited by the timescale of the ground to M-state transition ($\tau_{568}\cong50$ μs).

Time-resolved switching data for periodic green-pump modulation are presented in FIG. 11(a). The traces reveal a fast transient timescale $\tau_{532} < 200$ ms (instrument limited) associated with the phototransformation of the ground to the M state and a slow thermal ground state recovery at $\tau_A \sim 11$ s. Significantly faster probe modulation was achieved by alternate illumination with the green and a blue (~405 nm) pump laser (FIG. 11(b)). The blue pump induces a photochemical transition of the M to the ground state at a fast, 200-ns timescale. This is illustrated in the inset of FIG. 11(b) which shows the slow thermal ground state recovery turning instantaneous once the blue pump is applied. We observed probe intensity modulation with low-intensity pumps (<200 µW) even at the bR limiting switching timescale of $\tau_{568} \cong 50$ µs (FIG. 12). In general, the switching speed is limited by the slowest of the photochromic transitions; or, for the case of ultrafast photochromic molecular systems, by the cavity photon lifetime.

Methods: A silica microsphere on a stem was formed by melting the tip of a single mode optical fiber in a butane-nitrous oxide flame. Two parallel single mode optical fibers (SMF-28) held 250 µm apart in a standard 1 cm acid-resistant polystyrene cuvette were tapered by hydrofluoric acid erosion. The coupling efficiency on mechanical contact of the taper with the cavity was monitored throughout the etch and the process was terminated when the coupling efficiency was optimized. The final diameter of the etched tapers was approximately 2-3 µm. The etching solution was then replaced with 0.01 M phosphate buffered saline (PBS) with pH of 7.4 which was used throughout the measurements. Purple membrane layers of bR mutant D96N (Munich Innovative Biosystems) were adsorbed onto high-Q (~2×10$^6$) silica microspheres with a typical radius of R~150 µm using an alternate electrostatic deposition of cationic poly(dimethyldiallyl)ammonium chloride (PDAC) and anionic BR purple membranes from stock solutions. In each cycle, a single oriented ultra-thin (~55 Å-thick) PDAC/bR monolayer was self-assembled on the silica microsphere surface.

FIG. 8 shows the time trace of the resonance wavelength of a TM mode ($\lambda \sim 1,311$ nm) during bR adsorption on a PDAC-coated microsphere from a sonicated solution of D96N purple membranes in PBS (10 mM, 0.05 mg/ml bR, pH 7.4) at room temperature. The Langmuir-like adsorption kinetics points to self-assembly of a single membrane layer. The absorption trace can be fit well by: $\Delta\lambda = \Delta\lambda_{sat}(1-e^{-t/\tau})$, where $\Delta\lambda_{sat}$ is the wavelength shift at saturation and $\tau \approx 33$ min.

The monolayer formation is further confirmed by the estimate of the surface density of bR in the adsorbed layer ($\sigma_{bR}$) (FIG. 8). The surface density can be extracted from the perturbation result:

$$\sigma_{bR} \approx \left(\frac{\Delta\lambda}{\lambda}\right)\frac{\varepsilon_0(n_s^2 - n_m^2)R}{\alpha_{bR}} \qquad \text{Eq. S1}$$

where ($\Delta\lambda_{sat}/\lambda$) is the fractional resonant wavelength shift at saturation, R is the microsphere radius, $\alpha_{bR}$ is the excess molecular polarizability in excess to that of the displaced water, and $n_s$ and $n_m$ are the refractive indices of the sphere (1.47) and the PBS solution (1.33), respectively.

The total excess polarizability, $\alpha_{bR}$ is the sum of the protein ($\alpha_P$), the lipids ($\alpha_L$), and the retinal ($\alpha_R$) contributions, i.e. $\alpha_{bR} = \alpha_P + \alpha_L + \alpha_R$. The polarizability of a protein is proportional to its molecular weight (MW). We can therefore estimate $\alpha_p$ from the known molecular weight of the bR protein monomer (MW$_p$~26.78 kD) by taking bovine serum albumin (BSA, MW$_{BSA}$~66.44 kD, $\alpha_{BSA} = 4\pi\varepsilon_0(3.85 \times 10^{-21}$ cm$^3$) = $2.60 \times 10^4$ au) as a reference. From the ratio $\alpha_p/\alpha_{BSA} = 26.78$ kD/66.44 kD we obtain a value of $\alpha_p \approx 4\pi\varepsilon_0(1.56 \times 10^{-21}$ cm$^3$) = $1.05 \times 10^4$ au. We then consider 10 Haloarchaeal lipids surrounding a bR monomer and quantify their contribution to the excess polarizability $\alpha_{bR}$ at $\alpha_L = 4\pi\varepsilon_0(0.85 \times 10^{-21}$ cm$^3$) = $5.73 \times 10^3$ au using the polarizability values for lipid bilayers reported by Salamon et al. Finally, we use the reported calculated values of the retinal polarizability components, $\alpha_{xx} = \alpha_\parallel$ and $\alpha_\perp \cong \frac{1}{2}(\alpha_{zz} + \alpha_{yy})$ to calculate the average molecular polarizability $\alpha_R$ in the probing TM-direction. This is the polarizability at the angle $\theta \sim 65°$ made by the probing field (TM) with the retinal orientation axis; and it is given by: $\alpha_R \cong \alpha_\perp \sin^2\theta + \alpha_\parallel \cos^2\theta$. From this we obtain the value $\alpha_R = 4\pi\varepsilon_0(2.4 \times 10^{-23}$ cm$^3$) $\cong 160$ au. Summing up the individual contributions we can now use Eq. S1 to evaluate $\sigma_{bR}$.

The obtained value of $9.8 \times 10^{12}$ cm$^{-2}$ is in agreement with the reported bR surface density in purple membrane patches ($9.12 \times 10^{12}$ cm$^{-2}$) obtained from high-resolution X-ray scattering measurements.

Figure 7:
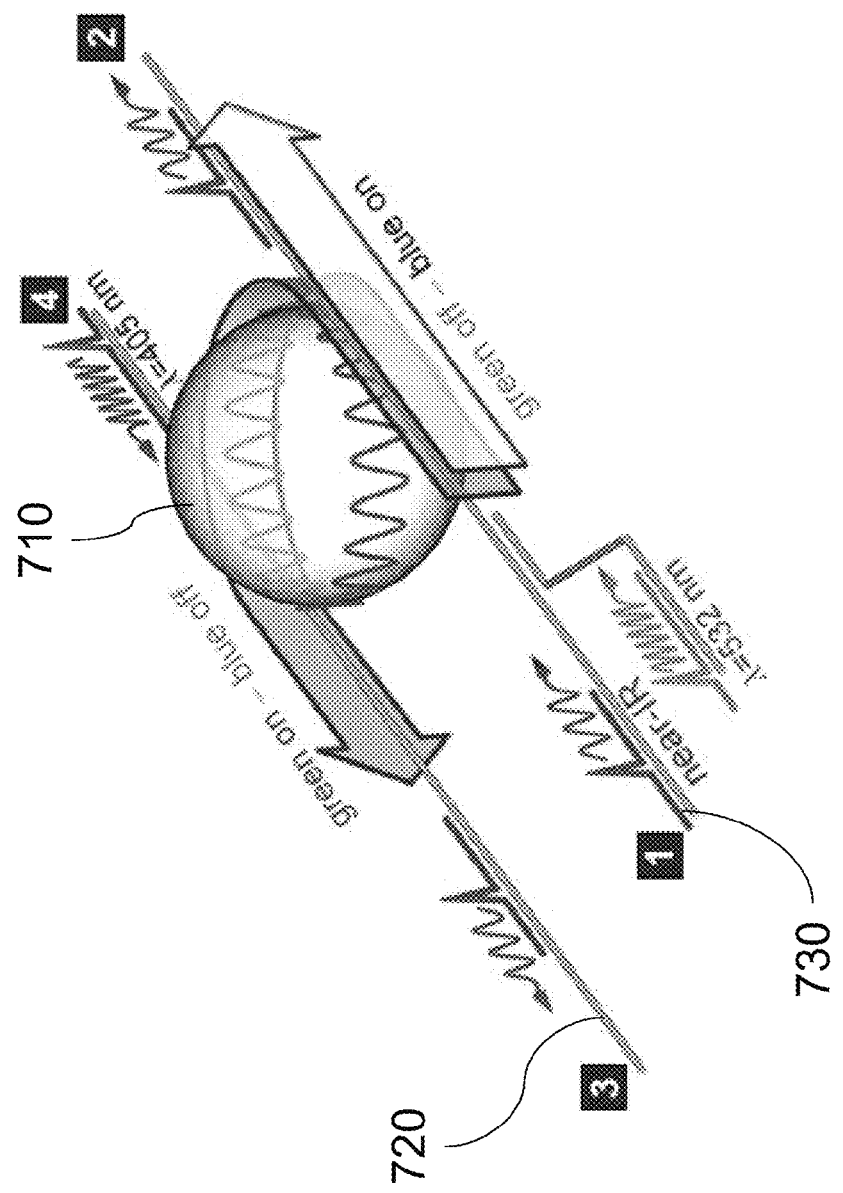
FIG. 7 shows a schematic representation of a resonant coupler used to demonstrate an all-optical switch operation of an MPC. A silica microsphere with adsorbed D96N is positioned between two optical fibers forming a tunable 4-port resonant coupler. Green (532 nm) and blue (412 nm) pump lasers, connected to input ports 1 and 4, respectively, control the conformation state of the retinal. When the green pump is off and the blue is on (all-trans isomer) the near-IR probe (1,311/1,550-nm telecom laser) is transmitted from input port 1 to output port 2 as indicated by the straight white arrow. Turning the green pump on and the blue off (13-cis isomer) reroutes the probe into output port 3 (red arrow).

The bR-coated microsphere (Q~$5 \times 10^5$), held by its stem on a translation stage, was spring-loaded between the two tapered fibers creating a four-port resonant coupler shown schematically in FIG. 7. WGMs were excited with telecom distributed feedback (DFB) lasers, operating around 1,311 and 1,550 nm, connected to port 1. To determine the resonant wavelength the laser modulation current was scanned periodically at 100 Hz with a sawtooth shaped function. The IR laser wavelength-tuning coefficients of ~0.0067 nm/mA for the 1,310 nm- and ~0.0056 nm/mA for the 1,550 nm-DFB at 20° C. were obtained using a wavemeter. InGaAs photodiodes connected to fiber ports 2 and 3 monitored the IR transmitted intensity and a spectrum containing 1,000 points per scan was recorded every ~200 ms with a Labview program. Polynomial fitting algorithms were used to determine the resonant wavelengths from the parabolic minimum (port 2) or maximum (port 3) fits to the resonant peak; typically with an experimental precision of ~1/50 of the linewidth. The polarization direction of the individual resonant modes was determined by the polarization analysis of the spectrum obtained from the light scattered tangentially off the microsphere surface.

Figure 14:
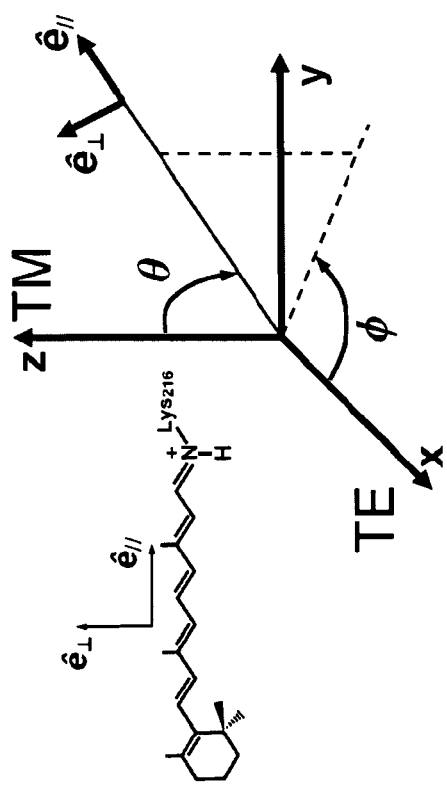
FIG. 14 shows the angles defining the retinal orientation relative to the polarization (TE or TM) of the probing resonance.

Retinal isomerization in a bR membrane adsorbed on a silica microsphere changes the dipole moment induced by the optical resonance. This causes a change of the photon energy of the resonant state which shifts the resonant frequency ω by:

$$\hbar \delta \omega \approx -\frac{1}{2} \vec{E}(\vec{r}, t) \cdot \delta \hat{\alpha} \cdot \vec{E}^*(\vec{r}, t) \qquad \text{Eq. S2.1}$$

where $\vec{E}(\vec{r},t)$ is the electric-field vector of the probing mode and $\delta \hat{\alpha}$ is the tensor describing the polarizability change upon retinal isomerization. For simplicity we consider the retinal as an axially symmetric, rod-like molecule undergoing changes of the molecular polarizability $\delta \alpha_{\parallel}$ and $\delta \alpha_{\perp}$ along the major retinal axis ($\hat{e}_{\parallel}$) and perpendicular to it ($\hat{e}\perp$), respectively. The retinal is oriented at an average angle $\langle \theta \rangle$ from the membrane plane normal (z) (FIG. 14). We use the longitudinal $\langle \theta \rangle$ and the azimuthal angle φ to define the orientation of the retinal with respect to the polarization directions of the resonant modes oriented along the x- (TE) and z-axis (TM) (FIG. 14).

For the TM mode $\langle \theta \rangle$ is constant for all possible in-plane orientations of the retinal. The fractional wavelength shift for TM modes upon retinal isomerization can be expressed in terms of the average angle $\langle \theta \rangle$ and the changes of molecular polarizabilities $\delta \alpha_{\parallel}$ and $\delta \alpha_{\perp}$. Expressing the fractional wavelength shift in terms of the molecular polarizability at an angle θ we obtain:

$$\frac{\Delta \lambda_{TM}}{\lambda} \approx (\delta \alpha_{\perp} \sin^2\langle\theta\rangle + \delta \alpha_{\parallel} \cos^2\langle\theta\rangle) \frac{I_{TM}}{E_0} \qquad \text{Eq. S2.2}$$

Here $I_{TM}$ is the average intensity of the TM mode at the resonator surface and $E_0 = 2\int_{\in_S} |\vec{E}(\vec{r})|^2 \, dV$ is the total electromagnetic energy contained in the interior of the microsphere with permittivity $\in_S$.

For the TE polarization the angle between the polarization direction (x) and the molecular axis varies with the retinal in-plane orientation represented by the azimuthal angle φ. Averaging this over all possible angles φ to account for contributions of retinal randomly oriented in the membrane plane we obtain:

$$\frac{\Delta \lambda_{TE}}{\lambda} \approx \frac{1}{2}[\delta \alpha_{\perp}(1 + \cos^2\langle\theta\rangle) + \delta \alpha_{\parallel} \sin^2\langle\theta\rangle] \frac{I_{TE}}{E_0} \qquad \text{Eq. S2.3}$$

The ratio of the resonant shifts for the TE and TM polarizations is then:

$$\frac{\Delta \lambda_{TE}}{\Delta \lambda_{TM}} \approx \frac{1}{2}\left[ \frac{\delta \alpha_{\perp}(1 + \cos^2\langle\theta\rangle) + \delta \alpha_{\parallel} \sin^2\langle\theta\rangle}{\delta \alpha_{\perp} \sin^2\langle\theta\rangle + \delta \alpha_{\parallel} \cos^2\langle\theta\rangle} \right] \frac{I_{TE}}{I_{TM}} \qquad \text{Eq. S2.4}$$

To simplify this equation further we assume equal intensities of TE and TM whispering gallery modes, i.e. $I_{TE} \approx I_{TM}$; as confirmed (within ~10% variation) by measurements of wavelength shifts due to absorption of globular proteins. We also introduce the ratio of the photoinduced changes in polarizabilities along the molecular axis and perpendicular to it: β = $\delta \alpha_{\parallel}/\delta \alpha_{\perp}$. Finally, the equation relating $\langle \theta \rangle$ to the wavelength shift ratio of TE and TM modes upon retinal isomerization thus becomes:

$$\frac{\Delta \lambda_{TE}}{\Delta \lambda_{TM}} \approx \frac{1}{2}\left( \frac{1 + \cos^2\langle\theta\rangle + \beta \sin^2\langle\theta\rangle}{\sin^2\langle\theta\rangle + \beta \cos^2\langle\theta\rangle} \right) \qquad \text{Eq. S2.5}$$

Figure 1B:
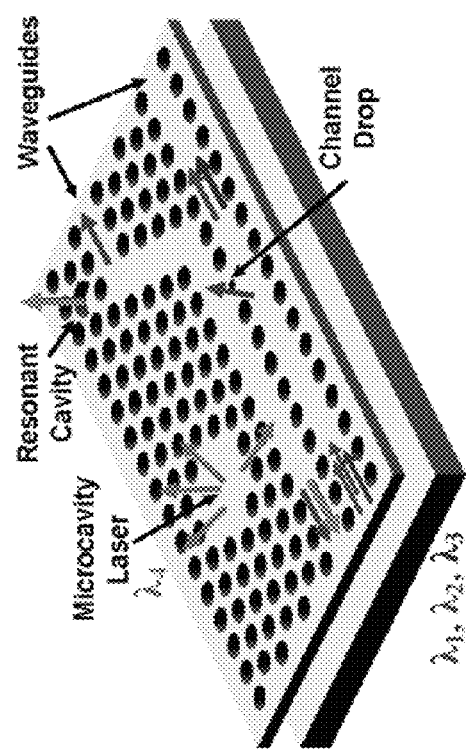
FIG. 1(b) shows a photonic crystal based photonic circuit that comprises waveguides, laser microcavity sources and a resonant microcavity integrated on a single photonic crystal chip in accordance with a preferred embodiment of the present invention. Parts of the microfabricated surfaces can be modified with ordered molecules forming hybrid molecular-photonic circuit structures (MPCs).

In general, manipulation of light using ordered (bio)molecules can be achieved in a photonic structure that comprises one or more input ports, a high-Q photonic element or slow light structure, an output port and waveguides to connect those elements (FIG. 1(*a*)). The waveguides 110 could be formed by ridge waveguides, photonic crystal waveguides (FIG. 1(*b*)) or any other waveguiding structure. Laser sources are coupled to the input ports 120. The input waveform can be continuous or any arbitrary waveform. The high-Q or slow light structure is modified with a single molecule or ordered aggregates of molecules. This layer of molecules is used to manipulate the light in the photonic device. Examples for manipulation and modulation include: phase modulation, amplitude modulation, reconfiguration of output ports 130, optical delay, optical memory and storage, hysteresis, optical computation using the quantum structure of the molecular layer, logic operations such as NAND, NOR, optical inverter, pulse generation, induced oscillations, synthesis of arbitrary waveforms. The modulated output can also report a sensing event such as molecular binding, molecular insertion, cooperative transformation of the molecular layer, photoinduced conformational changes, electrically induced conformational changes, and changes in polarizability.

High Q-photonic circuit elements can be fabricated on the microscale using conventional photonic materials such as silica and silicon (FIG. 1(*b*)). They typically operate at the telecom wavelength of 1310 nm or 1550 nm. However, for purpose of sensing and other applications, other wavelength such as visible or mid-IR are desirable.

Figure 2:
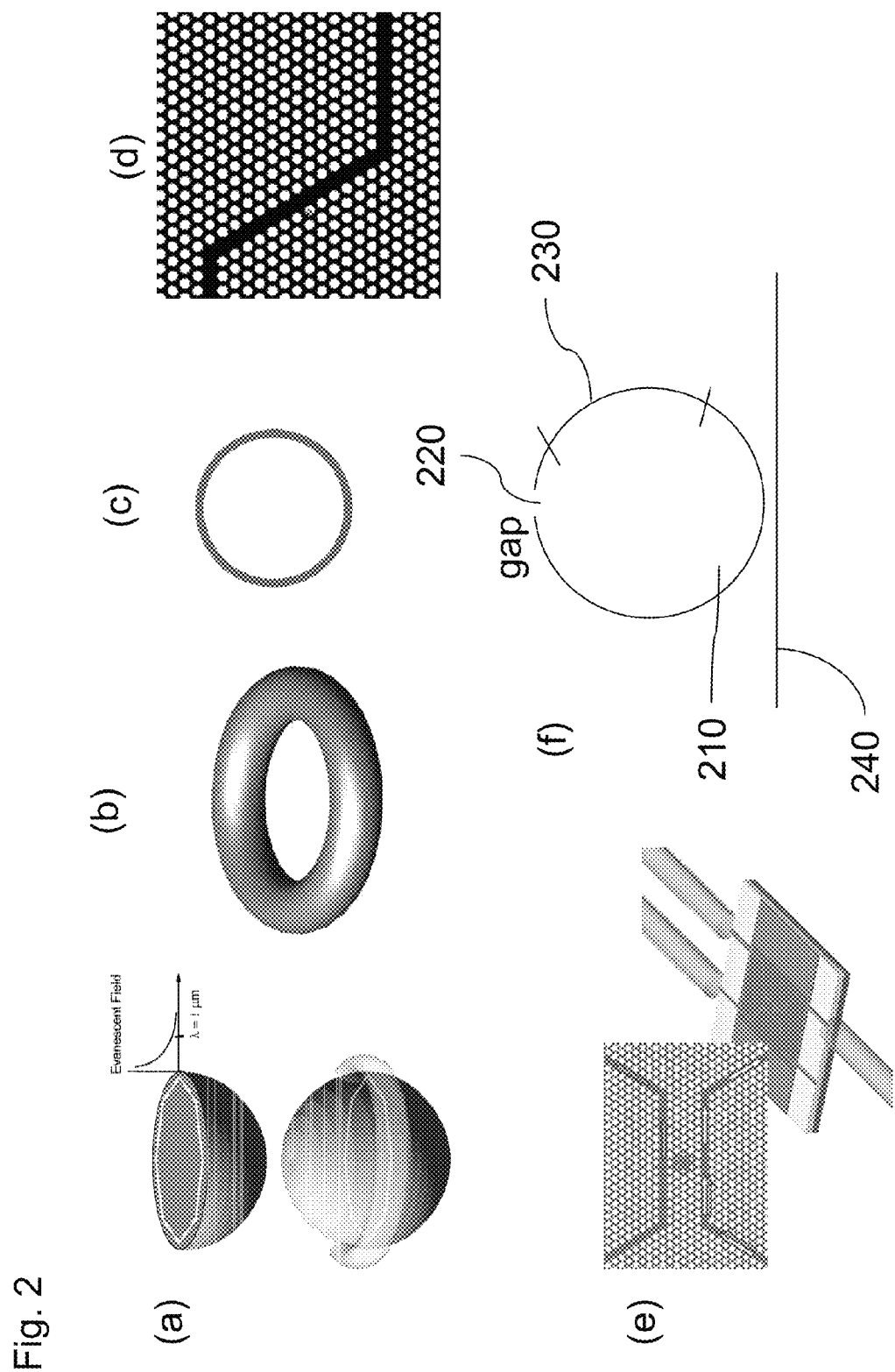
FIGS. 2(a)-(f) are example diagrams for (a) a spherical microcavity, (b) a toroidal microcavity, (c) a ring resonator cavity, (d) a photonic crystal waveguide, (e) a photonic crystal defect cavity with bus waveguides, and (f) an active cavity based on a ring resonator connected to a bus waveguide in accordance with various preferred embodiments of the invention.

FIG. 2 shows various high-Q photonic and slow light circuit elements where the optical response is enhanced. FIGS. 2(*a*), (*b*) and (*c*) respectively show a microcavity in the form of a sphere, toroid and ring. Typically, such circuit elements provide surfaces that can be used as molecular interfaces. Ordered molecular aggregates can be crafted on such surfaces using methods of self-assembly or electrostatic or dynamic layer assembly as well as molecular lithography, soft lithography and contact printing. Furthermore, photonic crystals (FIG. 2(d)) already provide access to the optical path (mode volume) through microfabricated holes. Molecules may be deposited in such holes for the purpose of light manipulation. Access to the mode volume in completely solid cavities such as microdisks is possible through fabrication of new holes and other structure using e.g. focused ion beam sculpting. FIG. 2(e) shows a resonant coupler based on a photonic crystal cavity. If the cavity is modified with a photochrome such as bR light can be rerouted all-optically between two output waveguides. The cavity may also contain active (gain) material such as quantum dots, erbium, ytterbium, fluorophores etc. The active material can be pumped electrically or optically in order to compensate for optical losses. This is especially important for photonic circuits that contain loss elements such as a ring resonator with a gap (FIG. 2(f)). In this case, optical losses experienced by the gap can be compensated for by optical amplification. Effectively, a very high-Q factor can be achieved while tolerating significant scattering and other losses. FIG. 2(f) shows a ring resonator 210 with a gap 220 and a section of Erbium-doped waveguide 230. Light is coupled into the structure from an evanescently coupled bus waveguide 240. The pump (not shown) (e.g. wavelength=980 nm) as well as the light used to excite resonances (e.g. wavelength=1550 nm) in the ring structure 210 are coupled through the same fiber in this example.

Figure 3:
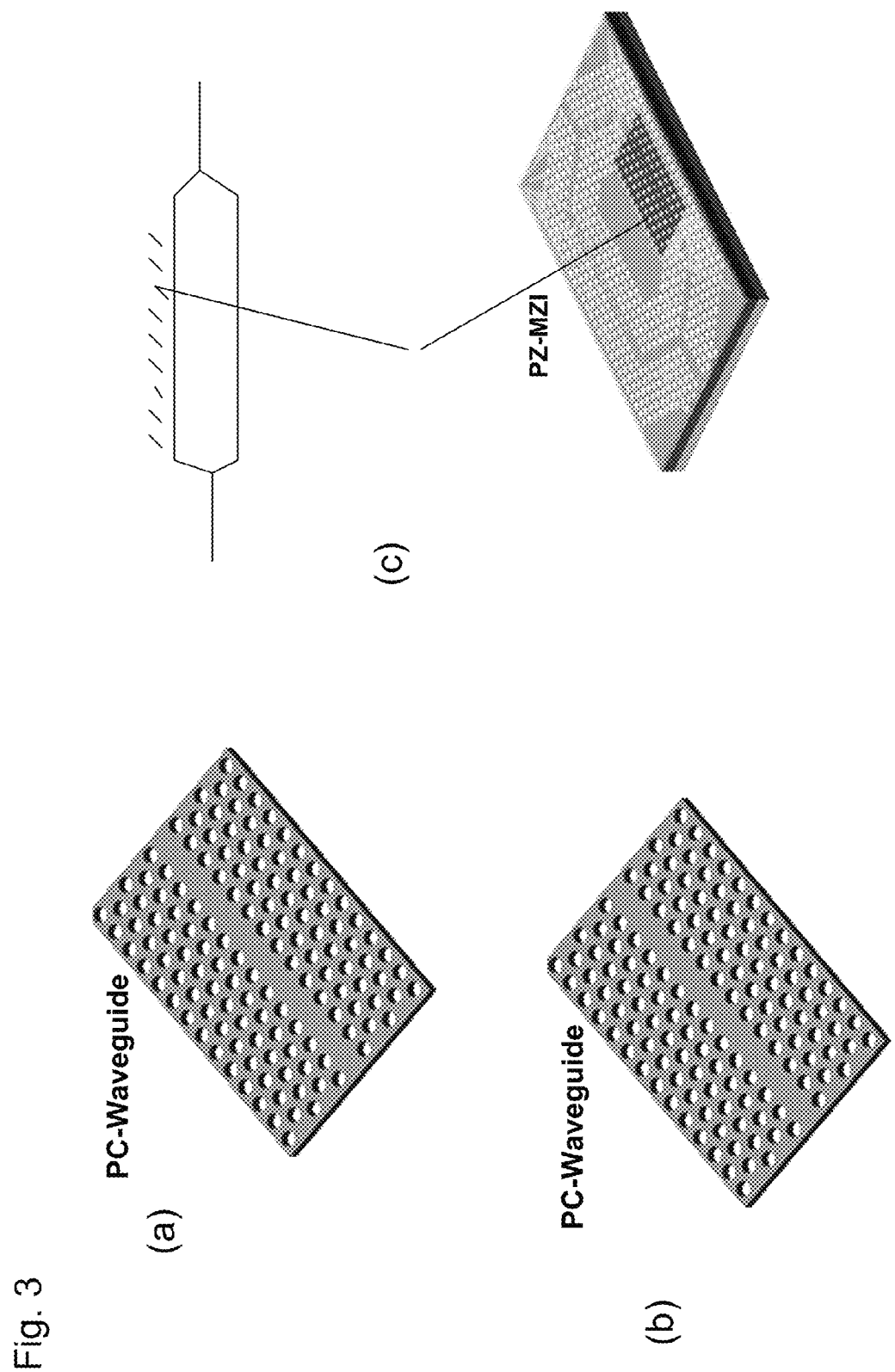
FIG. 3(a) is a diagram that exemplifies photonic circuit elements with long photon confinement or enhanced interaction lengths such as a photonic crystal waveguide in accordance with a preferred embodiment of the invention.
FIG. 3(b) shows a photonic crystal waveguide in accordance with a preferred embodiment of the present invention.
FIG. 3(c) shows a Mach-Zehnder interferometer built from ridge waveguides and from photonic crystal waveguides where one arm is modified with ordered molecules in accordance with a preferred embodiment of the present invention.

Dispersion in a photonic crystal can produce slow light. Any interaction with molecules is enhanced in such slow light structures (FIG. 3(a)). The enhanced interaction with molecules can be used to conversely tune the slow light photonic circuit by changes in molecular composition, conformation or polarizability. Routing of light on the nanometer scale may be achieved in MPC based on photonic crystals (FIG. 3(b)) or Mach-Zehnder interferometers (FIG. 3(c)).

Figure 4:
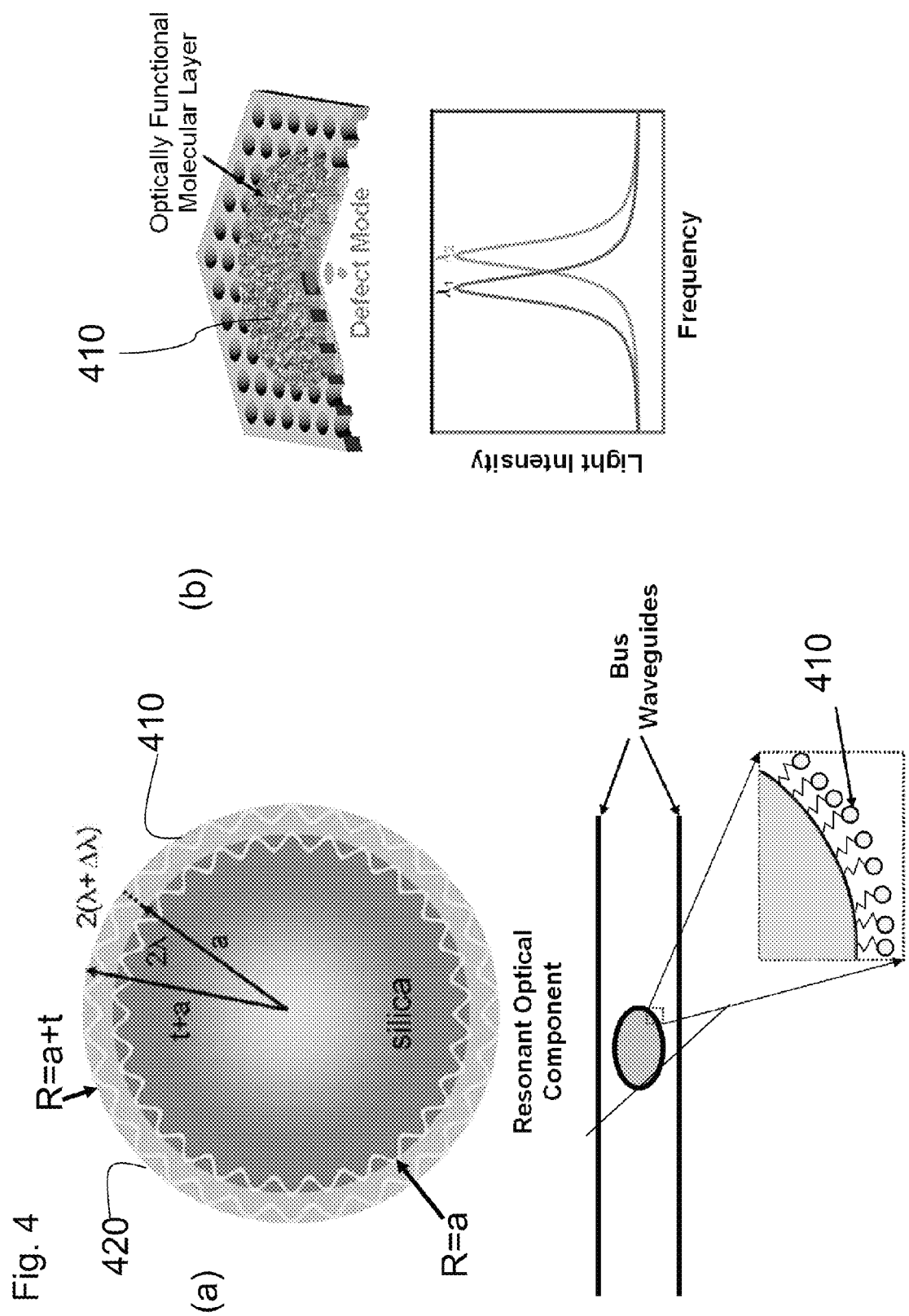
FIG. 4(a) is a diagram showing assembly of molecular aggregates on the surface of a microsphere cavity in accordance with a preferred embodiment of the present invention: the addition of the molecular layer of thickness t shifts the resonance wavelength by $\Delta\lambda$. The cavity is connected to bus waveguides. The inset shows a monolayer of ordered molecules assembled on the sphere surface.
FIG. 4(b) shows assembly of molecules on a photonic crystal defect cavity. The spectrum shows shift of resonance wavelengths expected for a conformational change of the adsorbed material
Figure 5:
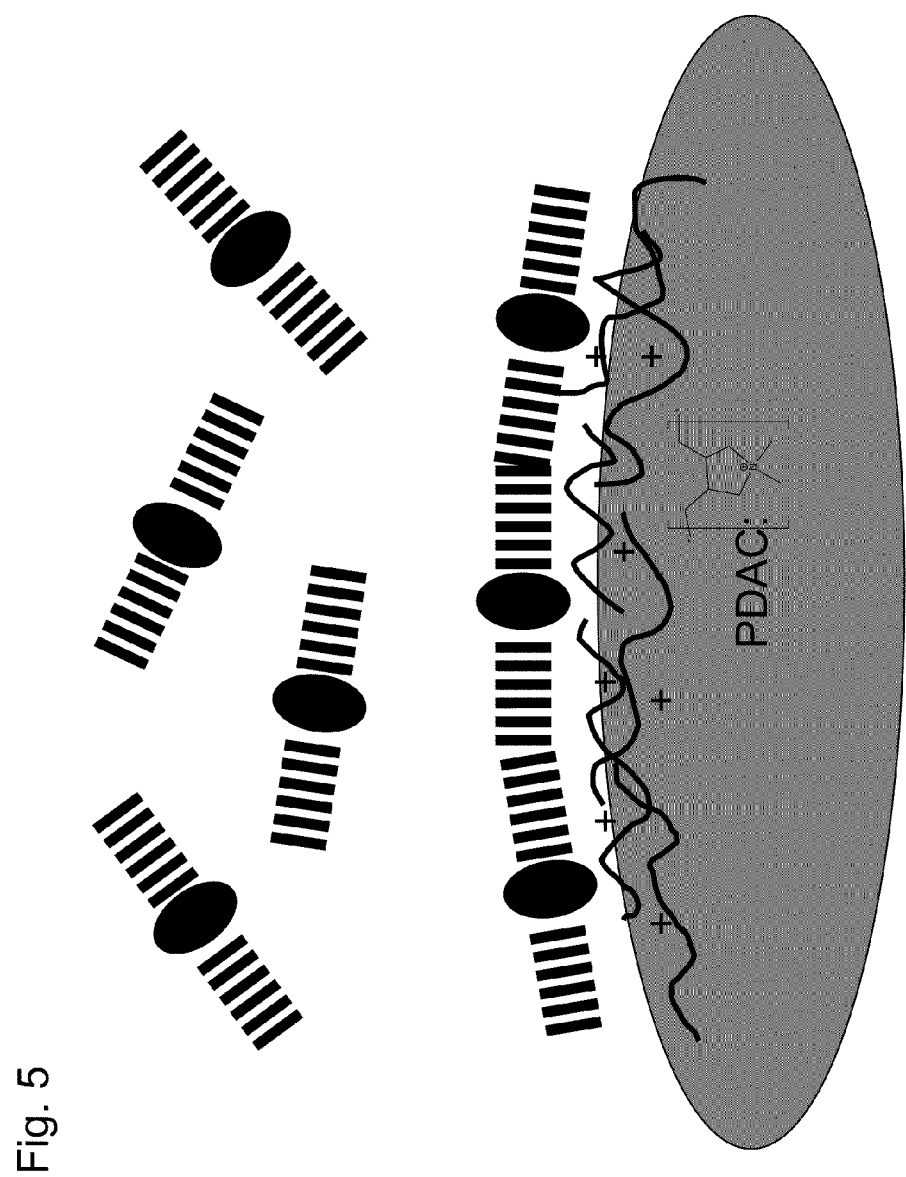
FIG. 5 is a diagram that shows assembly of a single lipid bilayer such as bacteriorhodopsin purple membrane on a microsphere cavity with PDAC (poly(dimethyldiallyl)ammonium chloride) coating.

The surfaces and the accessible modes in photonic circuit elements provide a convenient interface for assembly of molecular systems. For example, a monolayer 410 can be self-assembled on a microsphere 420 (FIG. 4(a)) or on part of the surface of a photonic crystal cavity (FIG. 4(b)). Modulation of the molecular layer e.g. by switching the molecular conformation can be used to shift the resonance frequency (FIG. 4(b), graph). Such a shift can then be used to reroute light frequency selectively into specific output ports of the MPC. FIG. 5 shows an illustration of self-assembly of a bR monolayer from solution (SAM by electrostatic adsorption). bR protein is embedded in a lipid bilayer which spontaneously surface assembles on the silica surface of a microcavity which has been modified with a cationic polymer (PDAC). The assembled membrane also has additional interesting properties such as self-healing, which may be relevant for fatigue resistant photonic devices.

Figure 6:
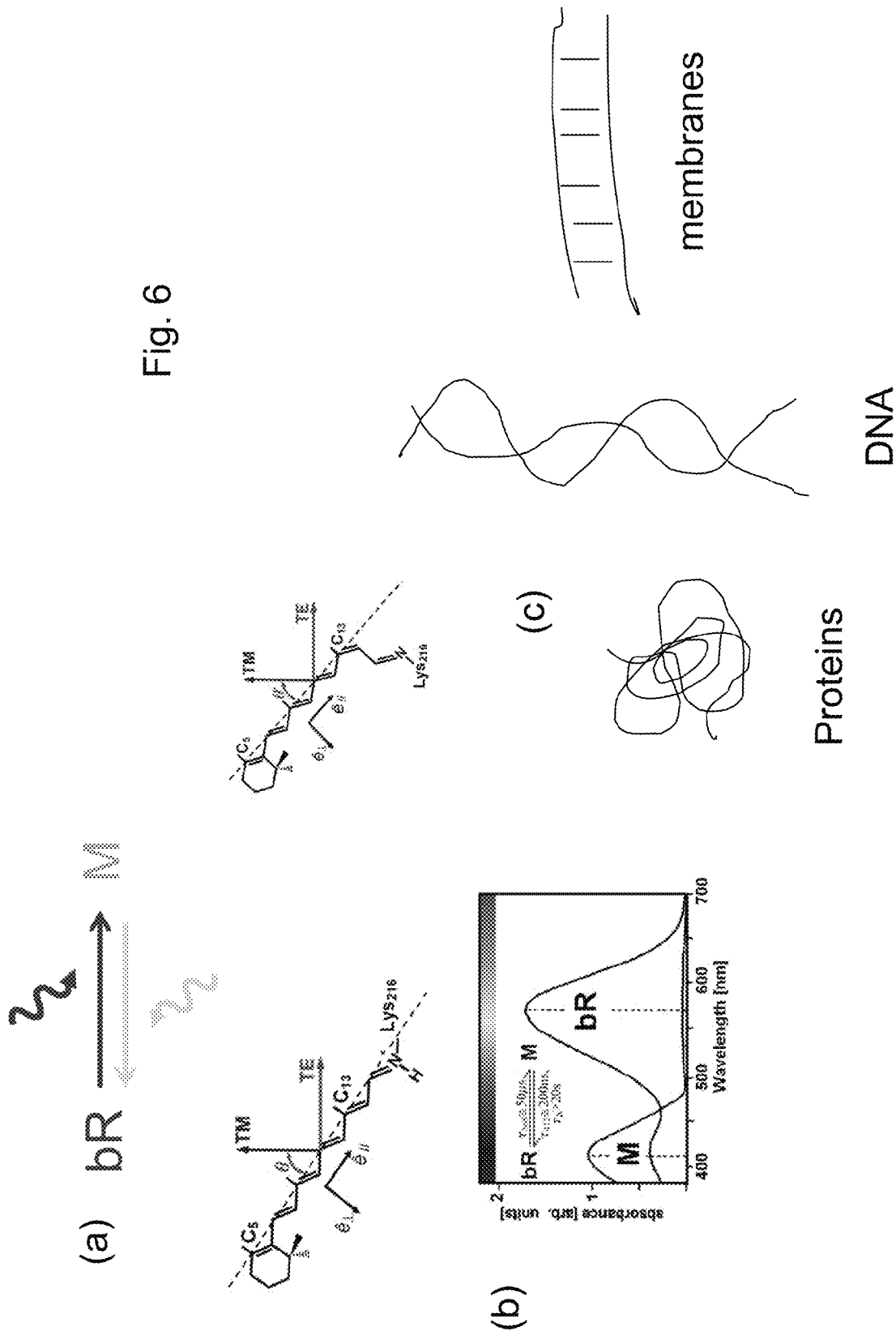
FIGS. 6(a)-(c) exemplify different organic and biological material for photonics.

Self-assembly is a general bottom-up approach to fabricate functional nanostructures on conventional photonic platforms. A wealth of optical functionality has been discovered in organic as well as biological materials that naturally self-assemble into ordered structures. Examples are photochromes such as the biological photochrome bR. Other examples are proteins such as GFP (green fluorescent protein) and its derivatives, light inducible promoters on DNA, membranes of photosynthetic organelles such as chloroplasts or membranes of mitochondria (FIG. 6). This approach is not limited to biomolecules. Synthetic or biomimetic organic molecules can be designed which self assemble into molecular aggregates that can perform specific photonic functions.

A self-assembled molecular layer may also respond to changes of physical parameters. Examples are membrane potentials which can change the polarizability and refractive index due to Pockels and Kerr effects. Temperature and pH can change the conformation of a molecule; pressure can change the molecular structure of a signaling molecule etc. FIG. 13 shows the differential response of a bacteriorhodpsin membrane measured with photoinduced membrane potential delta E optically from a change in polarizability. The measurement tracks the resonance wavelength of a signal that corresponds to the resonance wavelength difference between a TE and a TM mode in a microsphere cavity coated with 5 bR layers.

Figure 15:
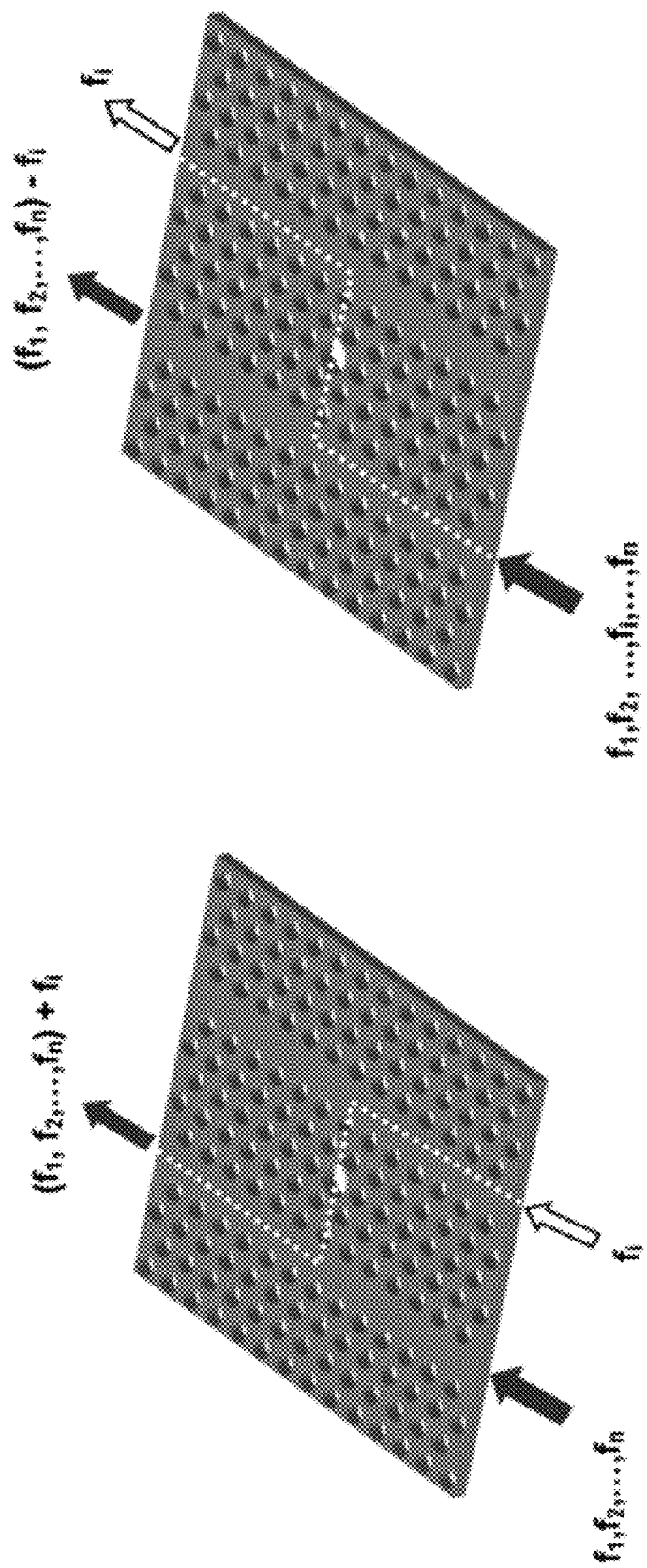
FIG. 15 shows an add-drop filter for wavelength division multiplexing applications. A tunable resonant cavity in the center of the structure routes a specific wavelength f1 into a drop channel. Routing is activated by changing the molecular properties of a surface assembled layer on top of the crystal defect cavity. Routing can e.g. be photoinduced.

For wavelength division multiplexing applications in telecom networks, tunable add-drop filters can be designed (FIG. 15). For example, a photonic crystal defect cavity couples between two waveguides. On coupling, a frequency selective signal f1 is dropped into one output port (right) or conversely, added into one output port (left). Coupling is photoinduced: a control signal is used to switch the conformation of a molecular assembly.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. An optical device comprising:
    an input waveguide;
    an output waveguide; and
    a resonant photonic structure, wherein said resonant photonic structure comprises one of a high Q microcavity structure and a slow light waveguide structure and said resonant photonic structure is optically connected to said input waveguide and said output waveguide;
    wherein at least one surface of said resonant photonic structure is modified with at least one material formed from one of a single molecule, an ordered aggregate of molecules and nanostructures; and
    wherein a linear response of said resonant photonic structure is altered by said at least one material.

2. An optical device according to claim 1, wherein said resonant photonic structure comprises a microspherical cavity.

3. An optical device according to claim 1, wherein said ordered aggregate of molecules or nanostructures comprises at least one selected from the group of: organic or biological monolayers, biological complexes, cell membranes, bacterial membranes, virus assemblies, nanowire or nanotube assemblies, quantum-dot assemblies, one or more assemblies containing one or more rhodopsins, green fluorescence proteins, diarylethers, lipid bilayers, chloroplasts or components, mitochondria or components, cellular or bacterial organelles or components, bacterial S-layers, photochromic molecules.

4. An optical device according to claim 1, wherein said molecular aggregate exhibits a photoinduced response.

5. An optical device according to claim 4, wherein said photoinduced response is a photochromic effect, a conformational change, a change of polarizability, a change of hyperpolarizability, a change of refractive index, a change of electronic state, a change in singlet states, a change in triplet states, a change in excited state polarizability, a change in 3D arrangement of atoms, a change in chemical composition, a change in chemical bonds, a change in molecular weight, a change in redox potential, a change in total charge, a redistribution of charge, a change in electronegativity, a change in acid or base strengths, a deprotonation or reprotonation.

6. An optical device according to claim 1, wherein said molecular aggregate exhibits a molecularly induced response.

7. An optical device according to claim 6, wherein said molecularly induced response is a conformational change upon binding of a molecule, a conformational change as a result of a cooperative transformation of a molecular assembly, a change in polarizability upon molecular binding, a deformation of the 3D molecular structure upon binding of a molecule, a change in molecular weight, a change in 3D arrangement of atoms, a dimerization or multimerization, an aggregations, a proteolysis, cleavage of a chemical bond, restriction of an oligonucleotide, change of DNA conformation due to protein binding, change of DNA conformation due to binding of an oligonucleotide, bacterial lysis, apoptosis.

8. An optical device according to claim 1, wherein said molecular aggregate exhibits an electronically induced response.

9. An optical device according to claim 8, wherein said electronically induced response is one of a membrane potential, a Kerr Effect, a Pockels Effect, a change in hyperpolarizability, a change in polarizability, a change in conductivity, change of the conductivity of an ion-channel, a conformational change of a voltage gated ion channel.

10. An optical device according to claim 1, wherein said molecular aggregate is anisotropic.

11. An optical device according to claim 1, wherein said molecular aggregate is formed by self-assembly.

12. A method for changing a linear response of a resonant photonic structure by forming a self-assembled molecular aggregate on said resonant photonic structure comprising the steps of:
   physically or chemically modifying specific parts of said resonant photonic structure;
   depositing a molecular aggregate on said resonant photonic structure;
   self-assembly of the deposited molecular aggregate; and
   sealing of the assembled molecular aggregate with one of a physical top layer and a chemical top layer.

13. A method for changing a linear response of a resonant photonic structure according to claim 12, wherein said resonant photonic structure is modified by contact printing, lithography, polymer coating, by light-activated molecules, nano-dip lithography, molecular lithography, atomic force microscopy, or soft-lithography.

14. A method for changing a linear response of a resonant photonic structure according to claim 12, wherein said deposition of molecular aggregates consists of self assembly from solution, micro-contact printing, Langmuir-blodget techniques, electronic depositioning, electrostatic layer-by-layer deposition, or assembly on chemically specific surfaces.

15. A method for changing a linear response of a resonant photonic structure according to claim 12, wherein said self-assembly is driven by entropy, enthalpy, or size-exclusion volume.

16. A method for changing a linear response of a resonant photonic structure according to claim 12, wherein said sealing of assembled molecular aggregates is achieved by sputtering, polymer deposition, electrocoating, self-assembly of a chemical, soft-lithography, or self-assembly of a monolayer or multilayer.

17. An optical device according to claim 1, wherein said resonant photonic structure comprises a gain medium.

18. An optical device according to claim 17, wherein said gain medium comprises one of erbium, quantum dots, ytterbium, neodymium, fluorophores, rhodamine 6G, cy5, and cy3.

19. An optical device according to claim 17, wherein said gain medium is pumped optically or electrically.

20. An optical device according to claim 19, wherein said pumping is achieved from optical waveguides or integrated electrical wires.

21. An optical device according to claim 1, wherein said material is used to manipulate the light.

22. An optical device according to claim 21, wherein said manipulation consists of at least one of manipulation of the phase and manipulation of the amplitude.

23. An optical device according to claim 21, wherein said manipulation is used to perform a logic operation.

24. An optical device according to claim 23, wherein said logic operation is realized between two input and two output waveguides that form a NAND or NOR gate.

25. An optical device according to claim 23, wherein said logic operation is an inverter.

26. An optical device according to claim 21, wherein the manipulation consists of a computation using the quantum nature (quantum wave function) of the ordered molecules or of a single molecule.

27. An optical device according to claim 21, wherein the manipulation consists of an oscillation, a parametric oscillation, or a pulse generation or generation of any other arbitrary waveform in the output signal from any arbitrary waveform of the input signal.

28. An optical device according to claim 1, where light propagation from an input to said input waveguide to an output of said output waveguide is nonreciprocal and can be used for optical isolation or for information encoding and decoding.

29. An optical device according to claim 1, wherein said optical device reroutes light for wavelength division multiplexing applications.

30. An optical device according to claim 1, wherein said optical device modulates a phase of light inputted to said input waveguide.

31. An optical device according to claim 1, wherein a state of configuration of the output is controlled with a low intensity pump.

32. An optical device according to claim 31, where the low intensity pump comprises a laser source coupled via waveguides to the MPC.

33. An optical device according to claim 1 that is bistable and can be used for information storage and retrieval.

34. An optical device according to claim 1, where a signal waveform at an input wavelength is replicated by said optical device at a different output wavelength but with higher intensity.

35. An optical device according to claim 34, where the replication can be time delayed.

36. An optical device according to claim 1, where short coherent pulses are created by cavity tuning.

37. An optical device according to claim 1 that exhibits weak coupling and can be used for spontaneous emission rate suppression and enhancement.

38. An optical device according to claim 1 that exhibits strong coupling and can be used for optical quantum computation.

* * * * *